M. DEVINE.
BREAD OR DOUGH CUTTER.
APPLICATION FILED FEB. 3, 1913.
1,081,099.
Patented Dec. 9, 1913.
2 SHEETS—SHEET 1.
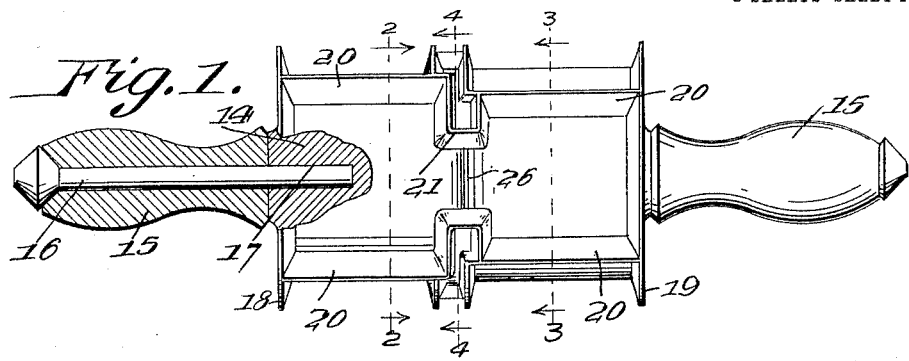
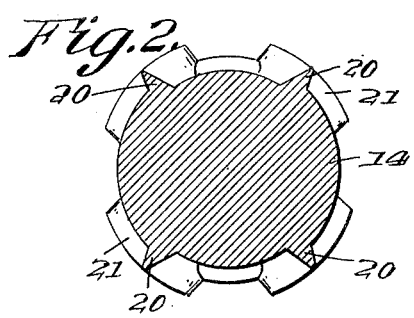
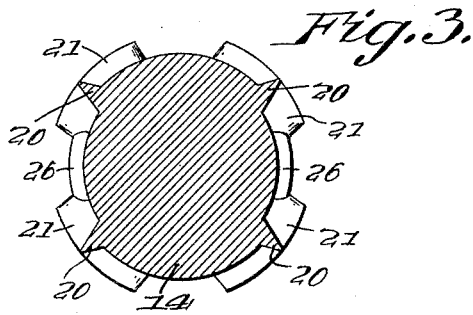
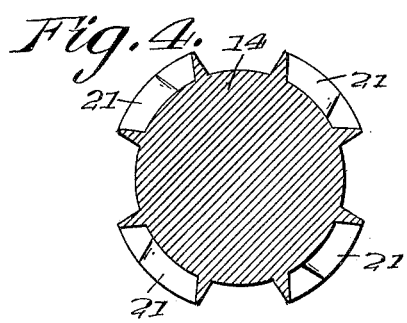
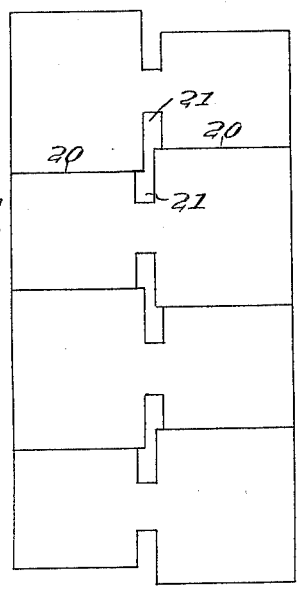
WITNESSES
INVENTOR
Manasses Devine,
by Franks. Analyman
Attorney M. DEVINE.
BREAD OR DOUGH CUTTER.
APPLICATION FILED FEB. 3, 1913.
1,081,099.
Patented Dec. 9, 1913.
2 SHEETS—SHEET 2.
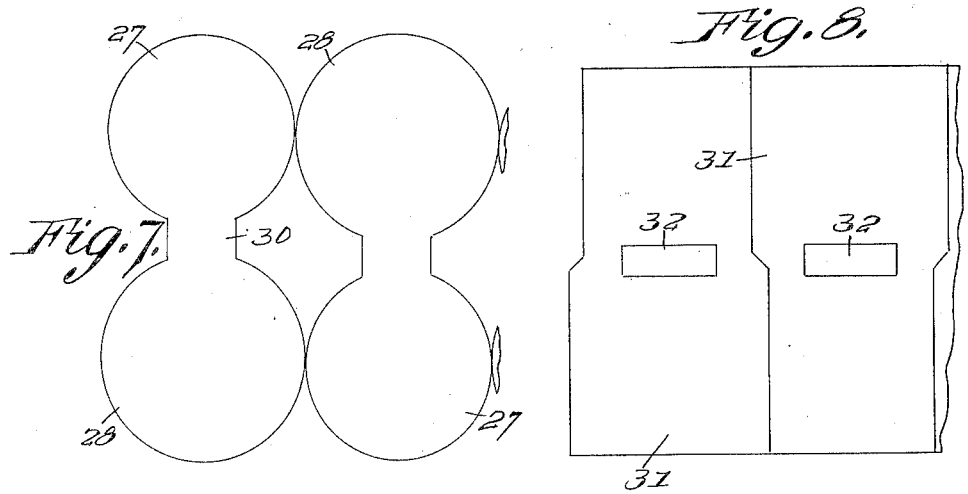
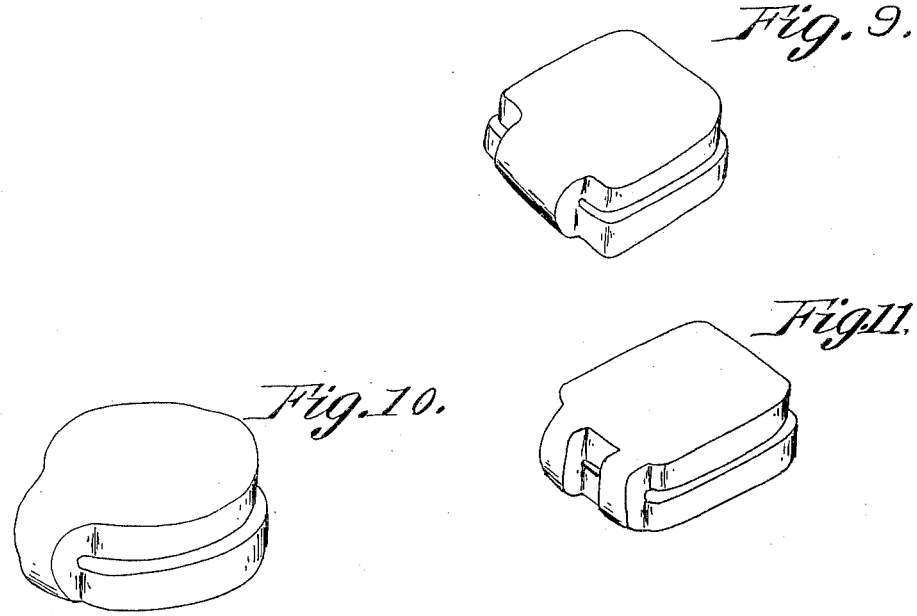
WITNESSES
INVENTOR

UNITED STATES PATENT OFFICE.

MANASSES DEVINE, OF JACKSON, CALIFORNIA.

BREAD OR DOUGH CUTTER.

1,081,099. Specification of Letters Patent. Patented Dec. 9, 1913.

Application filed February 3, 1913. Serial No. 745,980.

*To all whom it may concern:*

Be it known that I, MANASSES DEVINE, a citizen of the United States of America, and resident of Jackson, in the county of Amador and State of California, have invented certain new and useful Improvements in Bread or Dough Cutters, of which the following is a specification.

This invention relates to bread or dough cutters and it has relation more particularly to means for cutting dough to be formed into what may be termed "nugget folds," whereby the dough cut for each nugget fold is a continuous piece, one portion of which is preferably compressed so that it is thinner than the other portion thereof, means being provided for cutting away a portion of the dough transversely of the piece, thereby forming what may be termed a hinge at the intersection of the thin and thick part thereof, the so-called hinged part being gradually reduced in thickness from the thick to the thin portion of the material from which the nugget fold is to be formed.

A further object of this invention is to provide a rolling cutter so arranged that the said cutter may be rotated over the dough to be cut, the blades of the cutter being pressed in the dough for severing it into appropriate sizes for the purpose intended.

A still further object of this invention is to provide cutters which are flared from their cutting edges to their points of junction with the base of the cutter, thus causing slight bevel on the edges of the dough which is cut.

A still further object of this invention is to provide cutters which may have different configurations, so that the product may be of different designs as, for instance, they may be approximately square or approximately round.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation showing a rotary cutter embodying the invention, the same being partly in section; Fig. 2 illustrates a section on the line 2—2 of Fig. 1; Fig. 3 illustrates a section on the line 3—3 of Fig. 1; Fig. 4, illustrates a section on the line 4—4 of Fig. 1; Fig. 5 illustrates a longitudinal sectional view of the cutter; Fig. 6 illustrates a diagrammatic view of the cutter; Figs. 7 and 8 illustrate, diagrammatically, the different shaped cutters which may be used in connection with a roller for producing nuggets of different shapes; Fig. 9 illustrates a perspective view of a nugget fold formed by the cutter shown in Fig. 6; Fig. 10 illustrates a perspective view of a nugget fold produced by the cutters designed as shown in Fig. 7; Fig. 11 illustrates a perspective view of a nugget fold produced by a cutter such as is shown in Fig. 8.

In these drawings 14 denotes the roller, here shown as having handles 15 rotatable on the pins 16, having their ends 17 anchored in the rollers, Fig. 1 being broken away to disclose the parts of the device just described, partly in section and partly in elevation on one end of the roller, it being understood that the opposite end of the roller is likewise provided with parts corresponding to those just described.

The periphery of the roller contains cutting flanges 18 and 19 at its ends extending circumferentially thereof, the said cutting flanges being hereafter referred to as circular blades and it will be observed that the inner faces of the blades are tapered from their junctions with the roller to the cutting edges thereof.

The surface of the roller 14 contains a series of blades 20 extending longitudinally thereof from one circumferential blade to the other but each blade 20 has one portion thereof offset with relation to the other portion thereof and the opposite portions of the blade are connected by portions 21 which are loop-like structures extending circumferentially of the roller. It might be said that each blade 20 has loop-like extensions, one of which is oppositely disposed with relation to the other, the purpose of the invention being that the circumferentially extending portions of the blades 20 operate to remove portions of the dough or material at the junction of the thick and thin portions of the material from which the nugget fold is formed.

As shown in the diagrammatic view, Fig. 6, the blades are in such relation to each other that the distance between two of the parallel blades varies or is different at the two ends of the roller. For instance, as shown in Fig. 1, the two parallel knives, which are in full view, are closer together at one end of the roller than they are at the other, thus the dough cut by the said knives will be wider at one end than it is at the other and it is the purpose of the inventor to have the dough cut by said knives folded so that the dough cut by those portions of the knives which are wider separated overlies the portions of the dough cut by the knives which are closer together, the loop-portions 21 of the knives being effective to cut the dough to form what may be termed a hinge, joining the larger and smaller portions of the material from which the nugget fold is formed.

As shown in the drawings, and especially Fig. 5, the surface of the roller is tapered as at 26, the taper extending longitudinally of the roller, it being the purpose of the inventor to provide for the formation of the hinge between the two portions of the material from which the nugget fold is formed of slightly reduced thickness and to also provide for the formation of the two portions of the dough from which the nugget fold is formed of different thicknesses, it being understood that the portion of the material having the larger surface is the portion which is reduced in thickness by the pressure of the roller.

The modifications shown in Figs. 7 and 8 relate more particularly to the configuration of the cutters, which may be placed on rollers similar to those described and therefore, in describing the modifications, reference will not be further had to the said roller, it being understood that the modifications are designed for cutting dough into appropriate shapes, each piece cut thereby being designed to be folded on an integrally connecting portion which may be termed a hinge.

In Fig. 7, the cutters have approximately circular sections 27 which are smaller than the sections 28, the said sections being connected by the cutters 29 relatively close together so as to produce hinges 30 between the portions of dough produced by the cutters. As shown in Fig. 7 the circular sections 27 alternate with the circular sections 28 so that when the cutters are applied to a roller, the same number of sections 27 and 28 may be accommodated thereon and furthermore, there will be found a saving in the material being cut.

As shown in Fig. 11, the nugget fold formed by the cutters is approximately round, the said nugget fold having superposed layers of material joined by the hinge 30.

In the modification shown in Fig. 8, the cutters 31 are arranged to form substantially square products, and this form differs from that shown in Figs. 1 to 6 in that at the junction of the large and reduced portions of the cutters, there is a rectangular blade 32 extending transversely between the blades of the cutter and separated therefrom so that the hinges are formed between that portion of the material cut by the flanges or blades 32 and that portion which is cut by the blades 31, thus forming a product similar to that shown in Fig. 12, in which the hinges 33 are at or near the two edges of the portions of the material cut.

It is the purpose of the inventor to place small pieces of butter or the like on one portion of the material cut before folding the other portion thereover, although the inventor does not wish to be limited with respect to the manner of using the product of his cutter.

I claim—

1. In a dough cutter, a roller, cutters thereon extending circumferentially thereof at the ends of the roller, cutters extending longitudinally of the roller, one portion of each cutter being staggered with relation to the other portion thereof, looped blades connecting the staggered portions of each blade, the looped blades extending transversely of the roller in opposite directions, the portion of the roller between the blades at one end thereof being depressed with relation to the surface of the roller between the same blades at the opposite end.

2. In a dough cutter, a roller, circumferential blades thereon, blades extending longitudinally of the roller, the said blades each having a portion offset with relation to the other portion thereof and in such relation that parallel portions of the blades are closer together at one end of the roller than at the opposite end thereof, the offset portions of the longitudinal blade being opposite one another, looped cutters associated with each blade extending transversely where said blades are offset, said roller being of a configuration for reducing the thickness of one portion of each section of the material cut by the blades.

3. In a rotary cutter, a roller, circumferential blades near the ends thereof, blades extending longitudinally of the roller in spaced relation to each other, portions of said blades opposite one another being offset and more widely separated than other portions thereof, cutting means effecting a junction of the offset portions of the blades, and means for reducing the thickness of material cut by said blades at the junction of the offset portions of the blades.

4. In a cutter a body having cutters at the ends thereof and extending parallel with said ends, cutters on the body extending approximately at right angles to those at the ends thereof, the cutters extending from one end being offset with relation to the cutters extending from the opposite end, the offset portion of the cutters being opposite one another, cutters connecting the ends of the cutters extending from one end with the cutters extending from the opposite end, the said body having means for reducing the thickness of material acted on thereby at points between the first mentioned pairs of cutters alternately at the opposite ends of the body.

In testimony whereof, I hereunto affix my signature in the presence of two witnesses.

MANASSES DEVINE.

Witnesses:
T. M. RYAN,
F. W. RUHSER.

Copies of this patent may be obtained for five cents each, by addressing the "Commissioner of Patents, Washington, D. C."